United States Patent [19]

Clishem et al.

[11] 4,107,255

[45] Aug. 15, 1978

[54] MANUFACTURE OF IMPROVED FUSED CAST REFRACTORY

[75] Inventors: Thomas A. Clishem, Louisville, Ky.; Frederick D. Olympia, Elmira, N.Y.; Leonard W. Pokallus, Louisville, Ky.

[73] Assignee: Corning Glass Works, Corning, N.Y.

[21] Appl. No.: 820,534

[22] Filed: Aug. 1, 1977

Related U.S. Application Data

[63] Continuation-in-part of Ser. No. 558,301, Mar. 14, 1975, abandoned.

[51] Int. Cl.$^2$ .............................................. C04B 35/60
[52] U.S. Cl. ..................................... 264/299; 106/58; 264/332
[58] Field of Search ................... 264/299, 332; 106/58

[56] References Cited

FOREIGN PATENT DOCUMENTS 1,344,650  1/1974  United Kingdom.

*Primary Examiner*—Robert F. White
*Assistant Examiner*—John A. Parrish
*Attorney, Agent, or Firm*—Richard N. Wardell; Clarence R. Patty, Jr.

[57] ABSTRACT

Basic fused cast refractory with principal crystal phases of periclase and magnesium-spinel is made by adding nonfused oxidic inorganic grog particles to molten mass of the refractory as it is cast into a mold cavity, thereby resulting in increased modulus of rupture at temperature in the range of about 1340°–1500° C. and avoidance of shell formation. Molten mass has a composition consisting essentially (by weight) of 45–78% MgO, 0–30% $Cr_2O_3$, 0–35% $Al_2O_3$, 0–17% FeO + $Fe_2O_3$, at least 82% MgO + $Cr_2O_3$ + $Al_2O_3$ + FeO + $Fe_2O_3$, 1–8% $SiO_2$, 0–2% CaO + BaO + $SrO_2$, 0–10% $TiO_2$ and 0–3% fluorine. Nonfused particles have a loss on ignition at 1000° C. of less than about 0.5% by weight and an aggregate $SiO_2$ content at least about equal to the $SiO_2$ content of the molten mass forming the cast refractory. Grog particles are of a size (e.g., within the range of particles passing about 25 mm. sieve openings and retained by about 0.5 mm sieve openings) and in an amount (e.g., about 2.5 to 70% by weight of the cast refractory) sufficient to effect at least partial melting of and penetration into the particles by and resolidification with the cast molten mass so as to form a continuous coherent crystal structure throughout the solidified cast mass wherein discrete grog particles and remnants thereof (if any exist) are not optically identifiable.

13 Claims, No Drawings

MANUFACTURE OF IMPROVED FUSED CAST REFRACTORY

CROSS-REFERENCE TO RELATED APPLICATION

This is a continuation-in-part of application Ser. No. 558,301 filed Mar. 14, 1975, now abandoned.

BACKGROUND OF THE INVENTION

This invention relates to the manufacture of a chemically basic fused cast refractory of the type having principal crystal phases of periclase and magnesium-spinel, which are often associated with minor silicate phase. Exemplary illustrations of such type of refractory are disclosed in U.S. Pat. No. 3,198,643 and U.K. patent specification No. 965,850.

Solid small lumps, particles, granules, powder, pieces, fragments and the like (generally referred to herein as "grog") have commonly been added to cast molten refractory materials for the purpose of inhibiting the natural formation of relatively large shrinkage cavities during solidification thereof and of inhibiting other problems associated therewith, and thereby providing fused cast products with generally denser central portions. Specific practices implementing this general concept for various different compositions of fused cast refractory are disclosed in: U.S. Pat. Nos. 1,728,350 — 1,878,870 — 2,154,153 — 3,233,994 — 3,662,058 — 3,763,302, U.K. patent specification No. 392,364 and "Refractories" by F. H. Norton, 4th ed. 1968 (McGraw-Hill Book Co., New York, page 189. An apparent exception to this purpose is indicated in U.K. patent specification No. 1,344,650, which discloses improving thermal shock resistance of apparently otherwise dense fused cast refractory having periclase and calcium chromite primary crystal phases by the addition of magnesia particles to the cast molten refractory material.

In the particular case of basic fused cast refractory having periclase and magnesium-spinel primary crystal phases, the added grog has customarily been crushed scrap (or cullet) of that same basic fused cast refractory (e.g., see U.S. Pat. No. 3,763,302 and "Refractories" by Norton as cited above). While the resulting products of this latter case exhibit the noted generally denser central portions, many of them have been found to also exhibit one or two other apparently peculiar detrimental characteristics. One of these detrimental characteristics is the limited level of flexural rupture strength (modulus of rupture or MOR) of these fused cast refractories at service temperatures in the range of about 1340° to 1500° C. and particularly at about the latter temperature. The other detrimental characteristic is the formation of shell in these products, especially when cast of molten refractory material produced in a melting furnace operated at or near maximum capacity for volume output of molten refractory material therefrom per unit of time. Shell is a peculiar structural condition in a fused cast refractory product that develops during solidification thereof. It is the result of the formation of a substantial or at least semi-continuous band, layer or stratum of void spaces or cavities located a relatively short distance beneath and extending substantially parallel to the cast surfaces of the fused cast product which are formed adjacent to mold cavity surfaces. Such layer of cavities delineates overlying, relatively thin cast surface or "skin" portions substantially apart from the main body of the fused cast product. Those portions, referred to as "shell", are or become easily broken off the cast product upon its removal from the mold and/or during necessary subsequent handling of it. Those products with shell are generally not commercially saleable nor otherwise useful except as scrap for reuse as grog in the fusion casting process or as grain in rebonded fused grain bricks.

SUMMARY OF THE INVENTION

The present invention is based upon the discovery that the aforesaid problems of limited hot MOR and shell can be substantially overcome in basic fused cast refractory with principal crystal phases of periclase and magnesium-spinel and analytically consisting essentially (by weight) of 45–78% MgO, 0–30% $Cr_2O_3$, 0–35% $Al_2O_3$, 0–17% FeO + $Fe_2O_3$, at least 82% MgO + $Cr_2O_3$ + $Al_2O_3$ + FeO + $Fe_2O_3$, 1–8% $SiO_2$, 0–2% CaO + BaO + SrO, 0–10% $TiO_2$ and 0–3% fluorine. Ordinarily the $SiO_2$ is less than 5%. The discovered means for so overcoming those problems is the use (or substitution for prior fused grog) of suitably sized and proportioned particles of nonfused (i.e., never melted) oxidic inorganic material having a loss on ignition at 1000° C. (LOI) of less than about 0.5% by weight and an aggregate $SiO_2$ content at least about equal to the $SiO_2$ content of the molten mass forming the cast refractory as all or part (in amounts not less than any fused grog) of the grog added to the molten mass before, during and/or after pouring it into the mold cavity. The nonfused inorganic oxidic material is generally composed of refractory oxidic compounds having melting points in excess of 1300° C. and usually of oxide constituents employed in the basic fused cast refractory. The nonfused grog particles are of a size in an amount sufficient to effect at least partial melting of and penetration (e.g., diffusion and/or infiltration) into the particles by and resolidification with the cast molten mass so as to form a continuous coherent crystal structure throughout the solidified cast mass wherein discrete grog particles and remnants thereof are not optically identifiable (if such exist) to any substantial degree. Ordinarily, satisfactory results are attained with nonfused grog particles of sizes within the range of particles passing about 25 mm. (preferably 13.5 mm.) sieve openings and retained by about 0.5 mm. sieve openings, and with the aggregate added grog particles amounting to about 2.5 to 70% (desirably 5–50% by weight of the cast refractory. In those cases where the amount of added grog particles are in excess of about 35 wt.% of the cast refractory, at least that excess portion is constituted by $SiO_2$ (e.g., as silica sand and/or as part of another grog material partially composed of $SiO_2$, such as olivine, chrome ore, bauxite, etc.) to enable incorporation of such larger amounts of grog in accordance with the invention.

The invention can be stated as an improvement in the manufacture of the basic fused cast refractory described in the preceding paragraph wherein the above-noted improvement step (of substantially increasing the MOR at least within the temperature range of about 1340° to 1500° C. and inhibiting formation of shell in the refractory by providing at least half of the grog as particles of the nonfused material) is incorporated into the conventional process. Such conventional process generally comprises forming a molten mass of the refractory, pouring a stream of the molten mass into a mold cavity and thereby filling the cavity with the molten mass cast thereinto, adding particles of grog to the molten mass before, during and/or after pouring of it into the mold cavity, and at least partially solidifying the cast molten mass in the mold cavity to a state of self-sustaining cast shape substantially complementary to the interior surface configuration of the mold cavity.

DESCRIPTION OF PREFERRED EMBODIMENTS

EXAMPLE 1

As an exemplary case, the invention as hereafter illustrated in this example was applied to the manufacture of basic fused cast refractory wherein the magnesium-spinel phase is essentially a complex solid solution of oxides of mainly Mg, Fe, Cr and Al, the periclase phase contains some FeO (and possibly some small amount of other oxides) in solid solution therein, and the refractory analytically consists essentially of (by weight) 53–59% MgO, 16–24% $Cr_2O_3$, 9–13% FeO plus $Fe_2O_3$, 6–15% $Al_2O_3$, 1–3% $SiO_2$, 0.4–1.5% CaO, up to 2% $TiO_2$, and up to 1% fluorine. A typical average analytical composition is (by weight) 55% MgO, 19.6% $Cr_2O_3$, 11.0% FeO, 7.5% $Al_2O_3$, 2.0% $SiO_2$, 0.9% CaO, 1.6% $TiO_2$ and 0.3% fluorine.

Suitable inorganic refractory materials and particle sizes thereof for nonfused or foreign grog additions according to this invention are listed in Table 1 along with the typical prior known fused scrap grog of the above-described fused cast refractory composition. Ordinarily, they are employed in a substantially dry, low LOI or calcined state (i.e. LOI less than about 0.5% by wt.) because volatiles (e.g., water vapor, $CO_2$, etc.) of any substantial amount will cause a counteracting effect of promoting formation of shell and undesirable porosity. However, very limited amounts of otherwise suitable material with substantial LOI may be included in a grog mixture so long as the LOI of the whole mixture is less than about 0.5% by weight. These materials have typical analytical compositions (by weight) as shown in Table 2.

Table 1

| Material | Particle Sizes (U.S. Standard Seive No. Or Opening) | |
|---|---|---|
| | Passed Thru | Retained On |
| Magnesite (magnesia) | ½ inch | #200 |
| Transvaal Chrome Ore | ½ inch | #200 |
| Philippine Chrome Ore | ½ inch | #200 |
| Silica sand | ½ inch | #270 |
| Olivine | ½ inch | #270 |
| Zircon sand | #10 | #200 |
| Brucite | ½ inch | #200 |
| Bauxite | #4 | #10 |
| Fused grog | ⅜ inch | #8 |
| Alumina (tabular) | 1 inch | #10 |
| Ilmenite | #40 | #270 |
| Millscale | #4 | #270 | proportions of each material in each grog and the amount of each grog added as percent by weight of the cast refractory. These grog additions were usually made by dribbling the particles thereof at a substantially uniform rate into the pouring stream of the molten refractory mass during casting of it into conventional graphite-lined billet mold cavities.

Table 3

| | | Amount of Grog | |
|---|---|---|---|
| Material(s) | Proportions in Grog | Preferred | Range |
| Transvaal Chrome Ore | 50 | 12 | 7–15 |
| Magnesite | 50 | | |
| Silica sand | 100 | 10 | 2.6–65 |
| Silica sand | 64 50 33 20 | 12 | 8–20.5 |
| Olivine | 36 50 67 80 | | |
| Olivine | 100 | 12 | 8–20 |
| Zircon sand | 100 | 10 | 5–25.7 |
| Magnesite | 50 | 10.5 | 10.1–11 |
| Silica sand | 50 | | |
| Silica sand | 50 | 10 | 7–15 |
| Fused grog | 50 | | |
| Silica sand | 67   50 | 12 | 10–30.5 |
| Transvaal Chrome Ore | 33   50 | | |
| Silica sand | 25 | | |
| Olivine | 50 | 12 | 10–13 |
| Transvaal Chrome Ore | 25 | | |
| Olivine | 50 | 12 | 7–15 |
| Transvaal Chrome Ore | 50 | | |
| Transvaal Chrome Ore | 100 | 12 | 8–14 |
| Philippine Chrome Ore | 100 | 10 | 8–11 |
| Silica sand | 98.5 | 11 | 10–11.8 |
| Brucite | 1.5 | | |
| Silica Sand | 15 35 50 100 | | |
| Transvaal Chrome Ore | 42.5 32.5 25 0 | . | 30–70 |
| Magnesite | 42.5 32.5 25 0 | | |

Illustrative of the substantially increased high temperature MOR benefits of this invention are the data shown in Table 4. Those data are from cast billet products made with eight nonfused grogs in accordance with this invention and with the fused grog in accordance with prior practice. The average MOR values are based upon conventional flexure testing of several specimens of 1 × 1 inch cross-section sawn out of those products from a location about one inch below and parallel to a cast surface in order to avoid any imperfections in such surfaces that would likely give erroneous test values. Not only do these nonfused grogs provide very substantially high MOR at about 1340° and about 1500° C. in contrast to MOR at corresponding temperatures of fused grog products, but they also provide much higher retained MOR at about 1500° C. as a percentage of the MOR at about 1340° C. in comparison to such percent retained MOR of fused grog products. These dual improved hot MOR characteristics are typical of the present invention.

Satisfactory grogs formed of the preceding refractory materials are shown in Table 3 with the weight Table 2

| Material | mgO | CaO | $SiO_2$ | $FeO + Fe_2O_3$ | $Al_2O_3$ | $Cr_2O_3$ | $TiO_2$ | $ZrO_2$ | $MnO_2$ |
|---|---|---|---|---|---|---|---|---|---|
| Magnesite | 95–96 | 1 | 2–3 | 0.6 | 0.4 | 0.5 | — | — | — |
| Transvaal Chrome Ore | 10–12 | 0.2–0.5 | 1.5–4 | 23–26 | 13–16 | 44–46 | Trace–0.4 | — | — |
| Philippine Chrome Ore | 19 | 0.4 | 5 | 14 | 28 | 33 | — | — | — |
| Silica Sand | — | — | 99.92 | trace | 0.04 | — | — | — | — |
| Olivine | 50 | — | 41 | 8 | trace | trace | — | — | — |
| Zircon sand | — | — | 32.4 | 0.1 | — | — | 0.2 | 67.3 | — |
| Brucite | 60.1 | 2.6 | 4.3 | — | — | — | — | — | — |
| Bauxite | — | — | 5.7 | 1–3 | 89.7 | — | 1–2 | — | — |
| Alumina | — | — | 0.06 | 0.06 | 99.5+ | — | — | — | — |
| Ilmenite | 0.4 | 0.4 | 0.3 | 32.5 | 0.8 | trace | 61.9 | — | 0.9 |
| Millscale | — | — | — | 98+ | — | — | — | — | — |

Table 4

| Grog Composition | % Grog Added | Average MOR (psi) at 1340° C. | at 1500° C. | % Retained |
|---|---|---|---|---|
| 50% Transvaal Chrome Ore 50% Magnesite | 7-15 | — | 2074[2] | — |
| 100% Silica sand | 50 | — | 2758[2] | — |
| 100% Silica sand | 5.4-11.2 | 3078 | 2323 | 75.5 |
| 50% Silica sand 50% Olivine | 7-15 | 2566[1] | 1918 | 74.7 |
| 33% Silica sand 67% Olivine | 10-19 | 2530[1] | 1989 | 78.6 |
| 100% Olivine | 9-12 | 2676[1] | 1602 | 59.9 |
| 50% Silica sand 50% Transvaal Chrome Ore | 8-11.3 | 2502 | 1668 | 66.7 |
| 25% Silica sand 50% Olivine 25% Transvaal Chrome Ore | 10-13 | 2176[1] | 1439 | 66.1 |
| 100% Bauxite | 9.7-10 | 3102 | 1986 | 64.0 |
| 100% Fused | 9-9.5 | 2005 | 963 | 48.0 |

[1] Test temperature was actually 1350° C.
[2] Test temperature was actually 1480° C.

The data in Table 5 are typical illustrations of the drastically reduced shell losses by use of nonfused grogs in contrast to use of the fused grog in fused cast products of these two types made during the same or closely sequential periods of time (so as to compare the differing effects of the various grogs under the same or quite similar production operating capacity conditions of the melting furnace).

Table 5

| Nonfused Grog Composition | % Nonfused Grog Added | % Average Shell with Nonfused Grog | Fused Grog* |
|---|---|---|---|
| 100% Silica sand | 5.4-11.2 | 0.4 | 1.0 |
| 100% Silica sand | 50-65 | 0.0 | — |
| 50% Silica sand 50% Transvaal Chrome Ore 50-33% | 10-12 | 0.0 | 2.5 |
| Silica sand 50-67% Olivine | 7-19 | 0.0 | 3.5 |
| 100% Olivine | 9-12 | 0.0 | 3.7 |
| 50% Olivine 50% Transvaal Chrome Ore | 7-15 | 0.6 | 5.0 |
| 100% Transvaal Chrome Ore | 10 | 0.0 | ca.8 |
| 50% Transvaal Chrome Ore 50% Magnesite | 7-15 | 1.8 | 7.0 |

*9-10% added without any nonfused grog.

Limited field tests of panels of fused cast refractories made with the nonfused grogs noted above and located in the walls of basic steelmaking furnaces above and below slag lines in positions adjacent to similar fused cast refractories made with the fused grog showed that the former refractories exhibited somewhat less wear than the latter refractories. Such improvement in service life performance appears to confirm significance of the improved hot MOR properties of refractories according to this invention as being commercially meaningful.

The $SiO_2$ content of the nonfused grog appears to significantly contribute to developing the continuous coherent crystal structure, which in turn apparently contributes to the improved hot MOR characteristics. It is not clearly understood why the nonfused grog overcomes the shell problem.

EXAMPLE 2

The invention was applied in the manufacture of another basic fused cast refractory with complex magnesium-spinel and periclase phases similar to those in Example 1, but having an analytical composition consisting essentially of (by weight) 60-75% MgO, 12-18% $Cr_2O_3$, 7-11% FeO + $Fe_2O_3$, 4-10% $Al_2O_3$, 1-3% $SiO_2$, 0.4-1.5% CaO, up to 2% $TiO_2$, and up to 1% fluorine. A typical average analytical composition is (by weight) 65% MgO, 15.2% $Cr_2O_3$, 8.8% FeO, 6.8% $Al_2O_3$, 1.8% $SiO_2$, 0.6% CaO, 1.6% $TiO_2$, and 0.2% fluorine.

Three different grog additions were made to separate cast portions of molten refractory of the composition stated in the preceding paragraph. The total amount of each addition was 8.4 wt.% of the cast refractory. Those grog additions were as follows (by weight):

(1) 50% magnesia and 50% Transvaal chrome ore;
(2) 65% magnesia and 35% Transvaal chrome ore;
(3) 100% magnesia.

Each of them had an LOI at 1000° C. of less than 0.5 Wt.%; in fact, the first two mixtures showed a slight 0.079% weight gain at 1000° C. caused by oxidation of FeO in the chrome ore. Typical analyses of these grog materials were (by weight):

| Magnesia | Transvaal chrome ore |
|---|---|
| 94.5% MgO | 45.2% $Cr_2O_3$ |
| 0.85% CaO | 12.0% MgO |
| 1.5% $Fe_2O_3$ | 24.5% FeO |
| 1.5% $SiO_2$ | 14.5% $Al_2O_3$ |
| 1.0% $Cr_2O_3$ | 2.3% $SiO_2$ |
| 0.5% $Al_2O_3$ | 0.5% CaO |
| 0.15% $B_2O_3$ | 0.6% $TiO_2$ |

Particle sizing of the magnesite was − 4 + 200 mesh U.S. Standard Sieve, while that of the chrome ore was − ¼ inch + 200 mesh U.S. Standard Sieve.

Cast refractory products with the first grog showed only 0.7% shell defect and cast refractory products with the other two grogs did not exhibit any shell defect. These products also exhibited average MOR characteristics as follows:

| Grog | Average MOR (psi) at Room Temp. | at 1480° C. | % Retained* |
|---|---|---|---|
| 1 | 1253 | — | — |
| 2 | 1098 | 645 | 58.7 |
| 3 | 959 | 560 | 58.4 |

*MOR at 1480° C. as a percent of MOR at room temperature.

EXAMPLE 3

The invention can be applied in a manner similar to the previous examples, in manufacturing cast refractory products with a molten base melt analytical composition consisting essentially of (by weight) 65-69% MgO, 29–34% $Al_2O_3$, up to 1% CaO and up to 1% $SiO_2$. A typical average analytical composition (by weight is 67.2% MgO, 31.8% $Al_2O_3$, 0.5% CaO, 0.2% $SiO_2$, 0.1% $Fe_2O_3$ and 0.1% $Na_2O$. These cast refractory products have principal crystal phases of periclase and magnesium aluminate spinel. Alumina of particle sizes previously indicated can also be used as nonfused grog material in this example.

Cast refractory made according to this invention can be used in the as-cast form as bricks for constructing linings of furnaces and vessels, or it can be cast as billets which are sawed into bricks for the same purpose, or it can be crushed into grain which is rebonded by sintering (with or without other constituents) into similar bricks.

We claim:

1. The process of manufacturing basic fused cast refractory having principal crystal phases of periclase and magnesium-spinel and analytically consisting essentially of (by weight) of 45–78% MgO, 0–30% $Cr_2O_3$, 0–35% $Al_2O_3$, 0–17% FeO + $Fe_2O_3$, at least 82% MgO + $Cr_2O_3$ + $Al_2O_3$ + FeO + $Fe_2O_3$, 1–8% $SiO_2$, 0–2% CaO + BaO + SrO, 0–10% $TiO_2$ and 0–3% fluorine, which comprises forming a molten mass of the refractory, pouring a stream of the molten mass into a mold cavity and thereby filling the cavity with the molten mass cast there-into, adding particles of grog to the molten mass before, during and/or after pouring of it into the mold cavity, and at least partially solidifying the cast molten mass in the mold cavity to a state of self-sustaining cast shape substantially complementary to the interior surface configuration of the mold cavity, wherein the improvement comprises substantially increasing the modulus of rupture at least within the temperature range of about 1340° to 1500° C. and inhibiting formation of shell in the refractory by providing at least half of the added grog as particles of nonfused oxidic inorganic material having a loss on ignition at 1000° C. of less than about 0.5% by weight and an aggregate $SiO_2$ content at least about equal to the $SiO_2$ content of the molten mass forming the cast refractory, the aggregate added grog particles being of a size and in an amount to about 70% by weight of the cast refractory sufficient to effect at least partial melting of and penetration into the particles by and resolidification with the cast molten mass so as to form a continuous coherent crystal structure throughout the solidified cast mass wherein discrete grog particles and remnants thereof are not optically identifiable, and at least that portion (if any) of the grog in excess of about 35% by weight of the cast refractory being $SiO_2$.

2. The process of claim 1 wherein the grog particles are of sizes within the range of particles passing about 25 mm. sieve openings and retained by about 0.5 mm. sieve openings, and the aggregate added grog particles amount to about 2.5 to 70% by weight of the cast refractory.

3. The process of claim 1 wherein the nonfused grog particles are selected from the group consisting of silica sand, olivine, zircon sand, magnesia, chrome ore, bauxite, alumina, ilmenite, millscale and mixtures thereof.

4. The process of claim 1 wherein the magnesium-spinel phase is essentially a complex solid solution of oxides of mainly Mg, Fe, Cr and Al, the periclase phase contains FeO in solid solution therein, and the refractory analytically consists essentially of (by weight) 53–59% MgO, 16–24% $Cr_2O_3$, 9–13% FeO plus $Fe_2O_3$, 6–15% $Al_2O_3$, 1–3% $SiO_2$, 0.4–1.5% CaO, up to 2% $TiO_2$ and up to 1% fluorine.

5. The process of claim 1 wherein the grog is wholly particles of nonfused material.

6. The process of claim 2 wherein the aggregate added grog particles amount to about 5–50% by weight of the cast refractory.

7. The process of claim 1 wherein the grog particles are added into the pouring stream.

8. The process of claim 3 wherein the grog particles are a mixture of chrome ore and magnesia.

9. The process of claim 3 wherein the grog particles are a mixture of silica sand and olivine.

10. The process of claim 3 wherein the grog particles are chrome ore.

11. The process of claim 3 wherein the grog particles are a mixture of silica sand and chrome ore.

12. The process of claim 1 wherein the magnesium-spinel phase is essentially a complex solid solution of oxides of mainly Mg, Fe, Cr and Al, the periclase phase contains FeO in solid solution therein, and the refractory analytically consists essentially of (by weight) 60–75% MgO, 12–18% $Cr_2O_3$, 7–11% FeO + $Fe_2O_3$, 4–10% $Al_2O_3$, 1–3% $SiO_2$, 0.4–1.5% CaO, up to 2% $TiO_2$, and up to 1% fluorine.

13. The process of claim 1 wherein the magnesium-spinel phase is magnesium aluminate and the refractory analytically consists essentially of (by weight) 65–69% MgO, 29–34% $Al_2O_3$, up to 1% CaO and up to 1% $SiO_2$.

* * * * *